May 16, 1950 W. B. ELLWOOD 2,508,018

METHOD OF SEALING ELECTRICAL APPARATUS

Original Filed Dec. 5, 1947 2 Sheets-Sheet 1

INVENTOR
W. B. ELLWOOD
BY John A. Hall
ATTORNEY

May 16, 1950 W. B. ELLWOOD 2,508,018

METHOD OF SEALING ELECTRICAL APPARATUS

Original Filed Dec. 5, 1947 2 Sheets-Sheet 2

INVENTOR
W. B. ELLWOOD
BY John A. Hall
ATTORNEY

Patented May 16, 1950 2,508,018

UNITED STATES PATENT OFFICE 2,508,018

METHOD OF SEALING ELECTRICAL APPARATUS

Walter B. Ellwood, New York, N. Y., assignor to Bell Telephone Laboratories, Incorporated, New York, N. Y., a corporation of New York Original application December 5, 1947, Serial No. 789,845. Divided and this application January 24, 1948, Serial No. 4,150

3 Claims. (Cl. 29—155.5)

This is a division of application Serial No. 789,845, filed December 5, 1947.

This invention relates to glass sealed devices and particularly to a method of fabrication of electrical devices sealed in an atmosphere of gas other than air.

The object of the invention is to achieve economy and simplicity in the fabrication of devices having electrical apparatus working in a gaseous medium. Specifically an object of the invention is to avoid the use of special means for filling an envelope with gas after the apparatus has been sealed into such envelope, by making such seal in an atmosphere of the gas.

In accordance with this invention a method of sealing has been devised which includes a step of increasing the pressure of the surrounding gas as the seal becomes effective to avoid distortion of the seal due to increase of pressure within the sealed space on account of the heat.

The invention is disclosed as a method used in the fabrication of a relay contact unit of an improved type of such device as is disclosed in my Patent No. 2,289,830, granted July 14, 1942. The invention applies equally well to other electrical or electronic apparatus which must be sealed in an atmosphere of gas other than air.

A particular improvement in the present device is the method of filling the envelope with an inert gas whereby both seals are made between glass and the same size and type of magnetic reeds and no further processing for this purpose is necessary after the wires are thus sealed in. It should be especially noted that the highest development of the Ellwood unit heretofore used five parts, only two of which were alike, one of the parts being a tube used for the purpose of evacuating the vessel and filling it with inert gas.

In the present device the two wires are of magnetic material consisting of approximately 52 per cent nickel and 48 per cent iron. The exact composition is determined by the expansion coefficient required to match the glass. This alloy is malleable but since the ends of the wires in operation are caused to moved only a very short distance the elastic limit of even this malleable material is not exceeded at the point of the seal by the bending action thereof. The wires sealed within this tube have their ends overlapping and these are electroplated with rhodium which as a contact metal is very much harder than platinum and yet has a much lower specific resistance.

In the process of fabrication of this contact device the unit is placed in a solenoid by means of which the tips are caused to vibrate and to forcibly strike each other a large number of times.

By way of example, the solenoid may be connected to a source of 60-cycle alternating current so that the tips of the contact device are caused to strike each other one hundred and twenty times per second. If this operation is maintained for a period of about ten hours the contacts will be forced together about four million times. The kinetic energy expanded in this operation is turned into heat at the points of contact so that in combination with the malleable nature of the wires, the contact which at first is along a geometrical line parallel to the axes of the wires now becomes a pair of surfaces of considerable area strictly conforming to each other whereby low contact resistance is provided.

In the fabrication of this unit the first wire is mechanically and magnetically held in a given position within the tube and the end of the glass tube is then heated by a heating cool wound about it until the glass flows in naturally to the wire and makes a good seal thereto. When this has cooled, the second wire is placed within the tube and the two wires are magnetized by permanent magnets so that the adjacent ends become of the same polarity and are, therefore, repelled by each other and attracted to the magnets. While held in position by these magnetic forces the second seal is made. Both seals are made under a bell jar through which purified helium is passed so that the inner cavity of the tube is filled with helium. By way of example, the pressure of the helium within the finished product is about one to two pounds above atmospheric pressure.

A feature of the invention is a contact device using cylindrical wires contacting with each other along lines parallel to their axes.

Another feature of the invention is a contact device in which the contact pieces are rigidly sealed into position with respect to each other and in which the contact surfaces are formed by magnetic impact until they conform over considerable area with each other.

During the second sealing operation the inert gas trapped within the glass tube tends to expand by heat and, therefore, one of the essential steps in the process of fabricating this unit is to slowly increase the pressure in the bell jar and surrounding the outside of the unit as the seal becomes effective so as to prevent the trapped gas within the unit from escaping.

A feature of the invention, therefore, is an essential sequence in the steps of manufacture consisting of heating the end of the tube to form a seal and thereupon increasing the pressure external to the device to balance the pressure within the device as it is raised by the heating effect of the seal being formed.

Another feature of the invention is a method and a means for sealing glass sealed switches with any given or desired pressure therein. It has been noted hereinabove that, by way of example, the seal is made in an atmosphere of helium under about one pound pressure but that the pressure is increased as the seal becomes effective to counterbalance the increased pressure within the device due to the heating of the sealing operation. It is particularly pointed out that by this method such a glass sealed device may be filled with any desired pressure, it being only necessary during the final sealing operation to increase the external pressure sufficiently to counterbalance the internal pressure which is produced through the sealing operation.

Other features will appear hereinafter.

The drawings consist of two sheets having nine figures as follows.

Figure 1:
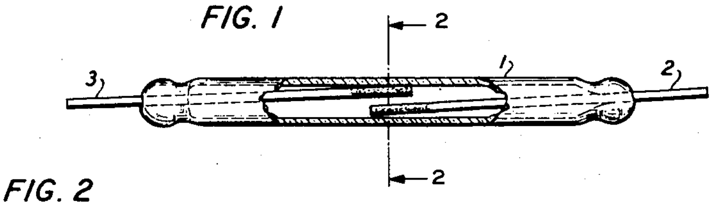
Fig. 1 is a side view partly broken away to show the form of the finished switching device.
Figure 2:
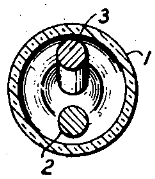
Fig. 2 is a cross-sectional view taken on the line 2—2 of Fig. 1.

The switching device consists essentially of three parts, a glass envelope 1 and two wires 2 and 3 which are identical in form and construction. In the fabrication of the device the wire 2 is first sealed into the right-hand end of the tube 1 and the seal produced is of the form shown, that is, the glass envelope makes an acute angle contact with the wire on the inside of the envelope. After this seal has been made the second wire 3 is introduced at the other end and sealed in under conditions which produce a seal as shown wherein the glass makes a practically right-angled contact with the wire 3. The wires 2 and 3 are plated at their contact ends within the envelope with a noble metal to protect the surface from oxide film prior to the sealing operation. Gold has been used for this purpose but rhodium is preferred since it has a very low electrical resistance and is extremely hard so that it forms a protecting sheath over the end of the wire which is an alloy of nickel and iron which having been annealed is very soft and malleable. As indicated both in Fig. 1 and Fig. 2, the contact tip of the wire 2 first sealed into the envelope has a slight clearance away from the inside wall of the envelope 1, whereas the tip of the second wire 3 actually rests against the inside wall of this envelope. The glass tube 1 is filled with an atmosphere of helium under very slight pressure above atmospheric pressure.

Figure 3:
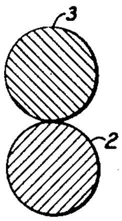
Figs. 3 and 4 are enlarged cross-sectional views to show the contact arrangement, Fig. 3 showing the contact arrangement before the switch has been operated and Fig. 4 showing in a greatly exaggerated form the deformation of the contacts after they have been hammered together by magnetic action in order to produce conforming surfaces.
Figure 4:
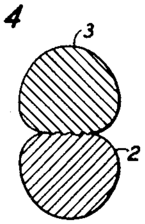

Figs. 3 and 4 are designed to show the manner in which good contact is produced between the overlapping ends of these wires. It will be realized that if in the construction of the device the two wires lie geometrically within the same plane then the contact between the two becomes a geometrically straight line. If, however, the wires are not exactly in the same plane then the contact between the two becomes geometrically a point. In either case the extent of the contact surface is extremely small. Therefore, after the device has been constructed the contact unit is placed within a coil and this coil is connected to a source of 60-cycle alternating current so that the two wires are made to forcibly strike each other at the rate of 120 impacts per second over a fair period of time so that this hammering results in a slight deformation of the two contacting surfaces to produce a form such as that shown in Fig. 4 in which two conforming surfaces of fair extent are produced. This is true even if the surfaces are hardened by a coat of rhodium. The underlying base deforms. It will be realized that in order to illustrate this point the deformation in Fig. 4 has been greatly exaggerated. It has been mentioned that the wires 2 and 3 are of soft and malleable material. The distance over which the ends have to travel in making contact with each other, however, is so small that the elastic limit of even this malleable material is not exceeded and hence these two wires act as springs.

Figure 5:
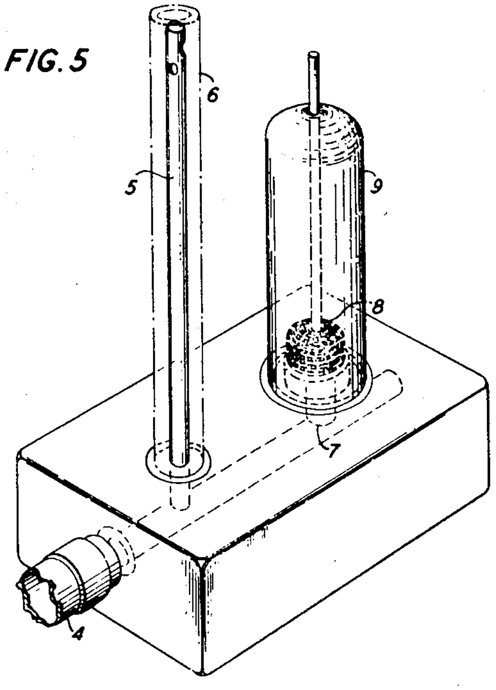
Fig. 5 is a device used in the manufacture of the switch consisting essentially of a vacuum cleaner for cleaning the glass tube and the contact wires.
Figure 6:
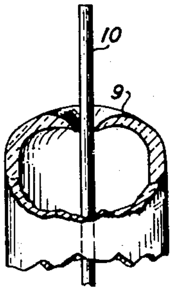
Fig. 6 is a greatly enlarged sectional view of the orifice of that portion of the vacuum cleaner used for cleaning the wires.

In the construction of this device both the glass tube and the wires are cleaned just before they are assembled in the jig for the sealing process. Fig. 5 shows a means for doing this. The pipe 4 shown broken away leads to a suction pump. This pipe is connected to a small pipe 5 practically equal in length to the length of one of the glass tubes and having orifices near its upper end so that when the tube 6 is placed thereover the very constricted area between the pipe 5 and the inner diameter of the tube 6 will efficiently clean the inside of the pipe by the rush of air therethrough. The pipe 4 is also connected to another small pipe 7 ending in a gauze strainer 8 and covered by a glass tube 9 being constructed at its upper end as shown in Fig. 6 so that a Venturi orifice effect is produced. When the wire 10 is inserted therein, the rush of air going through this orifice in the constricted area provided by the sharp edge of the glass tube 9 against the walls of the wire 10 makes an efficient cleaning device.

Figure 7:
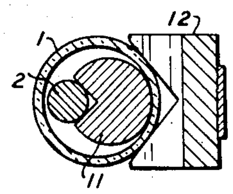
Fig. 7 is a cross-sectional view taken on the line 7—7 of Fig. 8 used to illustrate the positioning of one wire when the first seal is made.
Figure 8:
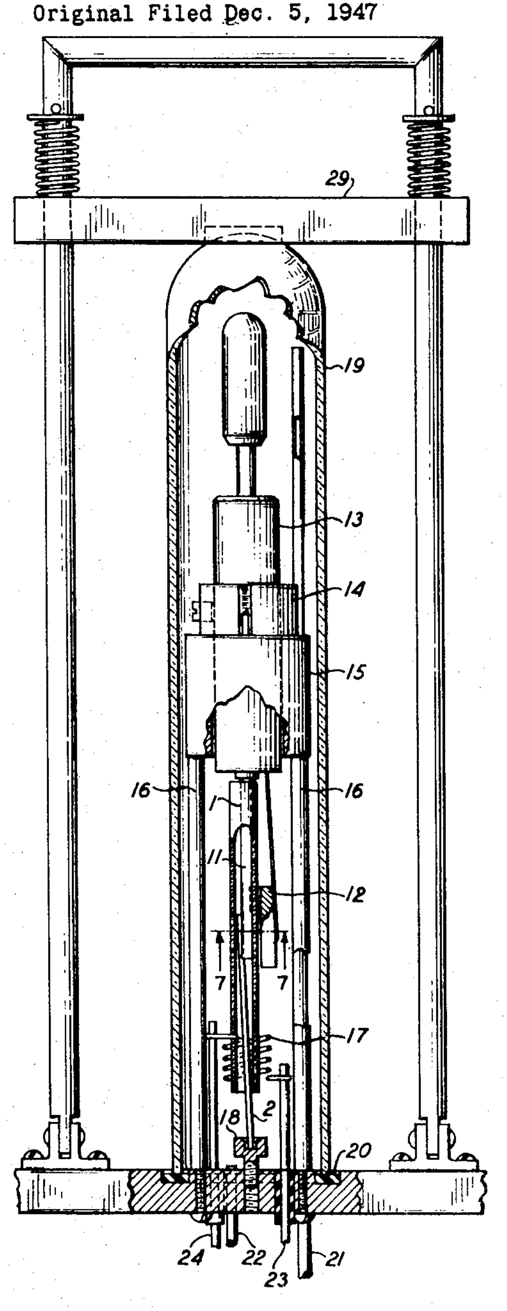
Fig. 8 is a side view partly in cross-section showing the positioning of the various components of the jig used in making the first seal.
Figure 9:
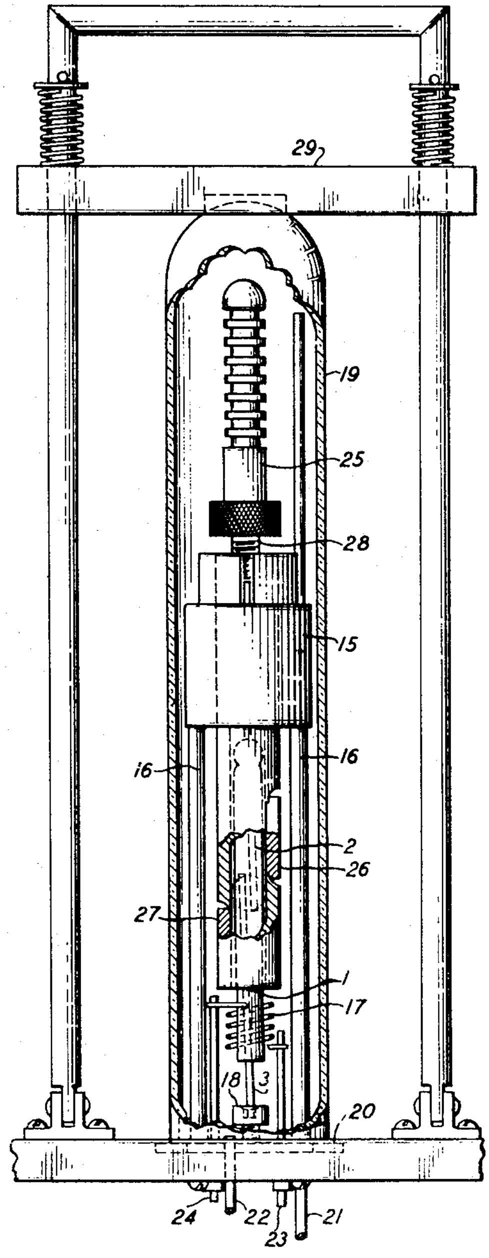
Fig. 9 is a similar view showing the jig used in making the second seal.

Fig. 8 shows a means for producing the first seal between the glass tube 1 and the wire 2. The tube 1 is slipped over the end of a metal part 11 so that the tube is held between this metal part 11 and a spring supported external piece 12 consisting of permanent magnetic material for the purpose of gripping the tube. The wire 2 is then inserted within this jig held tube and assumes the position as shown in Fig. 7 with its end slightly separated from the inside wall of the glass tube. This separation is intended to be as small as possible but certain tolerance must be provided for the differing internal diameters of the glass tubes obtained. The parts 11 and 12 are part of a jig shown in Fig. 8 consisting of a metal piece 13 with a collar 14 used in order to adjust the useful length thereof.

This jig is placed in an aperture in a piece 15 supported by the rods 16 and 17 so that the upper end of the glass tube 1 may be properly centered within the heating coil 17. A suitable material for this coil is an alloy of 98 per cent platinum and 2 per cent vanadium. When the tube holder 13 with the tube 1 and the wire 2 is inserted in this holder 15, the wire 2 is then pulled down slightly until it rests in a cavity of the adjustable stop 18. This stop may be magnetic to insure the wire remains seated properly. Thereafter a bell jar 19 is placed over this assembly and held in an air-tight condition by means of a gasket 20 of rubber-like material which will give good mechanical contact and be unaffected by the heat produced by the coil 17. Such a material is polyfluortetraethylene or one of the silicone rubbers. This bell jar 19 is then held firmly in place by a yoke 29 during the sealing operation. Before the actual sealing operation takes place a pipe 21 is connected to a reservoir of helium under about one pound pressure so that helium now flows through the entire inside of the bell jar and escapes through a pipe 22. After a certain short period of time determined by experience in which the ordinary elements of the atmosphere are washed out and the inside of the bell jar completely filled with helium, the coil 17 is energized through the wires 23 and 24 for a certain period of time. The coil 17 will heat the end of the tube sufficiently so that the glass will melt and form a seal such as that shown at the right end of Fig. 1. After the seal has been formed the current is disconnected from the coil 17 and the tube given a certain length of time to cool.

After this first sealing operation has taken place then the tube with its one wire is placed in a similar jig here designated generally by the number 25 and a second wire 3 is placed therein. Through a hole within the lower part of the jig it may be determined that the two wires 2 and 3 are properly overlapping each other when the wire 3 has been seated in the seat 18 in a manner similar to that in the previous operation. The jig 25 has incorporated in it two permanent magnets 26 and 27 which magnetize the two magnetic wires 2 and 3 in a like sense so that the adjacent ends repel each other. A magnet 28 in jig 25 acts as an end stop and also holds the first seal assembly by the wire 2. Therefore, the wire 3 during the second sealing operation will have its end resting against the inside wall of the glass tube. The bell jar 19 is again placed over this assembly and the same sort of sealing operation is employed. With this difference, however, after the current has been connected to the coil 17 the end of the tube which is melting must be carefully watched and as the molten glass comes in contact with the wire 3 the pressure of the helium within the bell jar 19 must be increased sufficiently to overcome the natural increase in pressure of the helium within the glass device produced by the heating of the end of the glass tube. This may be determined by a suitable time temperature relation in mass production of such switches. When this seal is completed the seal is allowed to cool, thereafter the pressure of the helium is reduced and the bell jar is removed so that the completed contact device may be taken from the jig.

A feature of the device is the use of circular cross-section contact wires whereby a device of the utmost simplicity is produced. A feature of the process whereby this device is fabricated is the use of an increasing pressure external to the device as the second seal is being made so that there is no tendency for this seal to be destroyed by the escape of the trapped gas as it is heated during the sealing operation.

What is claimed is:

1. The method of manufacturing sealed tubes having magnetically movable elements therein which consists of sealing an element in one end of said tube while mechanically positioned therein, positioning a second element in the opposite end of said tube by magnetic forces, sealing said other end to said second element and thereafter placing said formed device in a magnetic circuit to magnetically hammer the ends of said elements together for the purpose of forming microscopically conforming contact surfaces.

2. The method of manufacturing sealed magnetically permeable tubes each consisting of a straight length of cylindrical thermo-plastic material having magnetically movable elements sealed in each end thereof which consists of mechanically holding a first element in substantial coaxial relation with said tube, heating the end of said tube in which said element is inserted to form a seal between said element and said tube, placing a second element in the open end of said tube and holding it in substantial coaxial relation with said tube with its end overlapping said first element by magnetic influence, heating the open end of said glass tube and increasing the pressure external to said tube as the heated end of said tube contacts said second element and forms a closed envelope to counteract the increase of pressure within said closed envelope due to the heating of said glass tube.

3. The method of manufacturing a sealed tube containing an atmosphere of gas under any given pressure which consists of placing said tube in an atmosphere of said gas under said given pressure, sealing all except a final opening in said tube, heating the material of said tube about the final opening between the interior and the exterior of said tube until said opening becomes closed through the movement of said heated material and simultaneously increasing the pressure of said gas external to said tube to balance the increase of pressure within said tube caused by the heating thereof.

WALTER B. ELLWOOD.

REFERENCES CITED

The following references are of record in the file of this patent:

UNITED STATES PATENTS

| Number | Name | Date |
|---|---|---|
| 1,241,229 | Loepsinger | Sept. 25, 1917 |
| 2,048,556 | McArthur | July 21, 1936 |
| 2,136,932 | Budnick | Nov. 15, 1938 |
| 2,289,830 | Ellwood | July 14, 1942 |
| 2,406,008 | Ellwood et al. | Aug. 20, 1946 |
| 2,406,021 | Little | Aug. 20, 1946 |